Oct. 3, 1939.  J. G. BRYN  2,175,105
SYNCHRONIZED MIRROR
Filed June 6, 1938  2 Sheets-Sheet 1

Inventor
JOHN G. BRYN
By Norris + Bateman
Attorneys

Oct. 3, 1939.　　　　　J. G. BRYN　　　　　2,175,105
SYNCHRONIZED MIRROR
Filed June 6, 1938　　　　　2 Sheets-Sheet 2
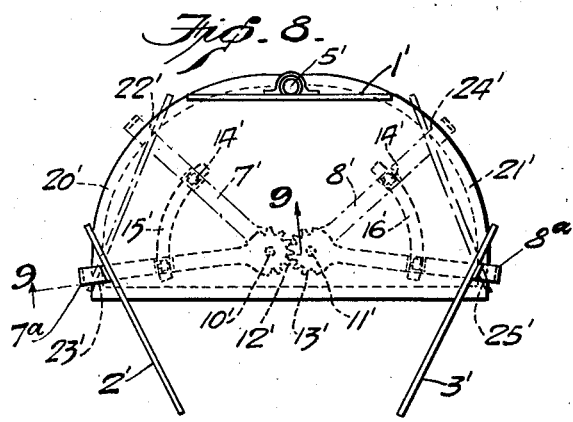
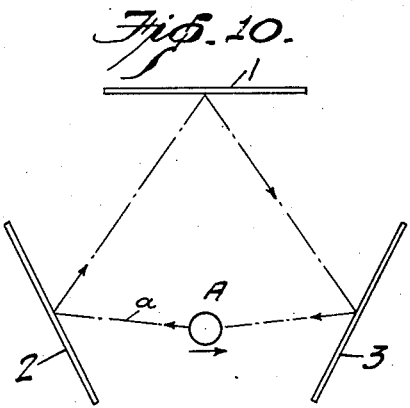
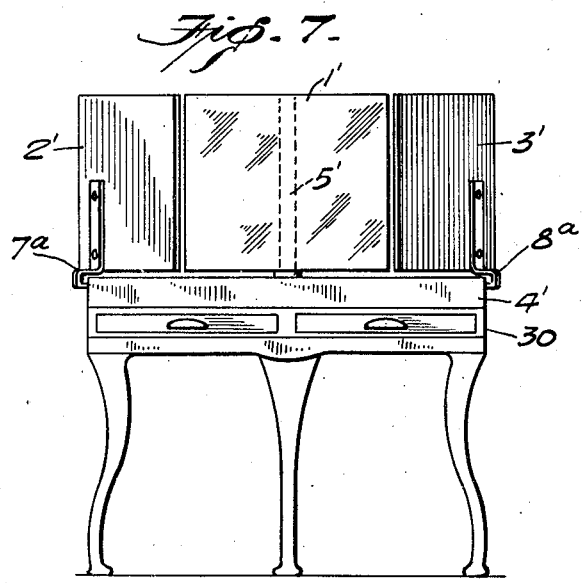
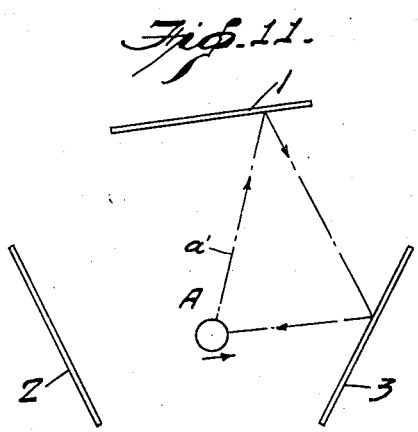
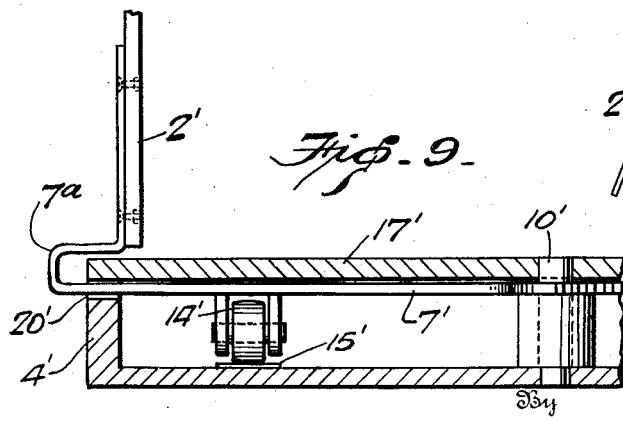
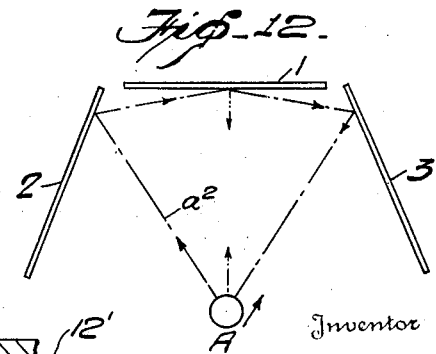
Inventor
JOHN G. BRYN Patented Oct. 3, 1939

2,175,105

UNITED STATES PATENT OFFICE 2,175,105

SYNCHRONIZED MIRROR

John G. Bryn, New York, N. Y.

Application June 6, 1938, Serial No. 212,171

4 Claims. (Cl. 88—84)

The present invention relates to mirrors and more especially to multiple type mirrors providing a plurality of reflecting surfaces which enable a person to obtain different views of himself.

The primary object of the invention is to provide a system of mirrors adapted to be used in stores and the like for affording either full or part length views of the figures of the purchasers of suits, gowns, shoes or other clothing, or the like, or to be used on stands or toilet or dressing tables or the like in the boudoir or in beauty parlors, hat stores and elsewhere, the mirrors being so arranged as to enable the user to obtain front, side, rear and profile views of the figure, as desired and with facility.

A more particular object of the invention is to provide a novel and improved system of synchronized mirrors which are pivotally mounted and operatively connected to swing in unison either into one definite angular relation to enable the mirrors to be used to give front or side views of a person or into another definite angular relation to give rear or profile views of a person while the person occupies a given position, the operative connection between the mirrors automatically synchronizing the swinging movements of the mirrors from one position to the other, and means being provided for positioning the mirrors in the correct angular relation.

More particularly, it is an object of the invention to provide a system of mirrors comprising a central mirror and a pair of side mirrors mounted pivotally with respect to the central mirror to swing on vertical axes either into positions to extend forwardly from the central mirror either divergently at such definite angles as to enable a person positioned opposite to the central mirror to obtain a front or side view of himself by looking into the central or one or the other of the side mirrors, or to swing into positions to extend forwardly from the central mirror convergently at such definite angles as to enable a person, by merely turning and looking into one or the other of the side mirrors, to obtain a rear view of himself.

Another object of the invention is to provide such a system of mirrors in which the central mirror is also pivoted to swing on a vertical axis whereby a person while in a position to look into one or the other of the side mirrors to obtain a rear view of himself, may, without changing his position, obtain a profile view of himself by merely swinging the central mirror at the appropriate angle with respect to the side mirror into which he is looking.

A further object of the invention is to provide a system of mirrors of this class in which the mirrors are so disposed as to render visible only a single reflection of the person at a time, thereby avoiding confusion as would result if a number of reflections were visible at a time.

To these and other ends, the invention consists in certain improvements and combinations and arrangements of parts all as will be hereinafter more fully described, the features of novelty being pointed out more particularly in the claims at the end of this specification.

In the accompanying drawings:

Fig. 7 is a front elevation of a dressing table having a system of mirrors embodying the present invention mounted thereon;

Fig. 8 is a top plan view of the mirrors shown in Fig. 7, the different operative positions of the side mirrors being indicated by the full and dotted lines;

Fig. 9 is a detail section, on an enlarged scale, taken on the line 9—9 in Fig. 8; and Figs. 10, 11 and 12 are diagrammatic views showing the different views a person may obtain with the mirrors adjusted to different operative positions.

Similar parts are designated by the same reference characters in the different figures.

Figure 2:
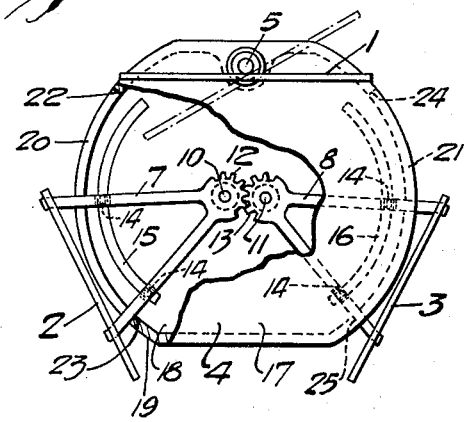
Fig. 2 is a top plan view, partly in section, of the mirrors shown in Fig. 1.
Figure 3:
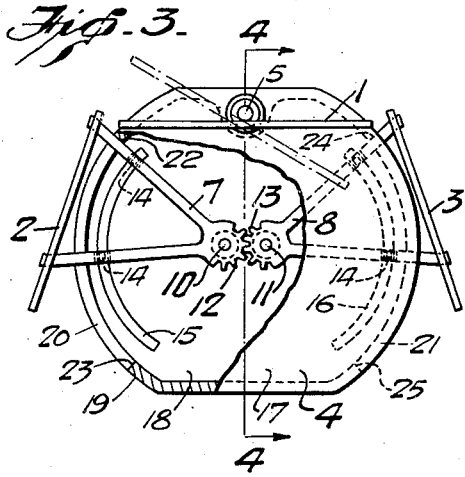
Fig. 3 is a view similar to Fig. 2 but showing the side mirrors in a different operative position.

Referring particularly to the embodiment of the invention shown in Figs. 1 to 6, inclusive, the system of mirrors according to the present invention comprises a central mirror 1 and side mirrors 2 and 3, these mirrors comprising for example glass plates provided with suitable mirror or reflecting surfaces. The central mirror 1 is mounted on the rear portion of a base 4, which is preferably of a shallow height and adapted to rest upon a floor, so that this central mirror may be swung about a vertical axis located midway or substantially so between the sides of this mirror, as by a pivot rod 5 suitably secured to the rear side of this mirror and rotatably fitted at its lower end in a socket 6 secured in the rear portion of the base 4. The side mirrors 2 and 3 are supported by arms 7 and 8 which are preferably branched as shown and turned upwardly at the outer sides of the respective side mirrors and secured thereto by suitable means such as screws 9. The inner ends of the arms 7 and 8 are pivoted to the base on adjacently located pivots 10 and 11, and the arms 7 and 8 are operatively connected, as by intermeshing gear segments 12 and 13, whereby swinging movements of the side mirrors about their vertical pivots 10 and 11 will be synchronized, swinging movement of either of these side mirrors causing the other side mirror to swing simultaneously therewith and through a corresponding angle. The weight of the side mirrors 2 and 3 which extend upwardly from the outer ends of the arms 7 and 8, is sustained preferably by rollers 14 rotatably mounted on the under sides of the respective arms and rolling on tracks 15 and 16 which are concentric with the respective pivots 10 and 11 and are mounted within the base 4.

Figure 1:
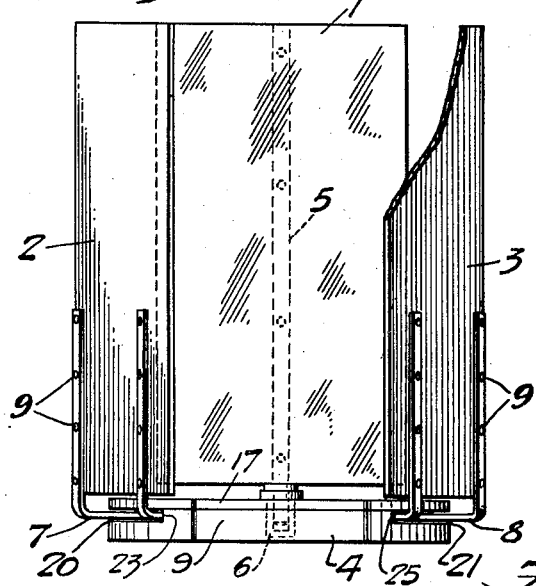
Fig. 1 is a front elevation, partly in section, of a system of full length mirrors embodying the present invention.
Figure 4:
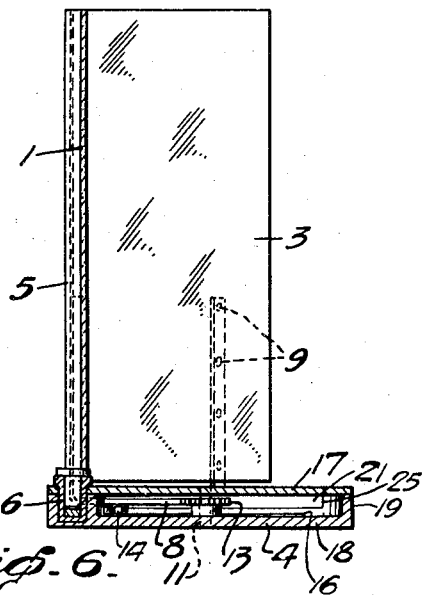
Fig. 4 is a vertical section taken on the line 4—4 in Fig. 3.
Figure 5:
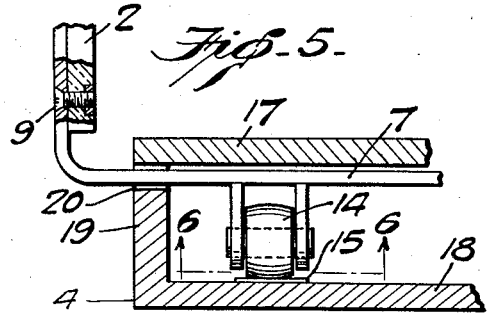
Fig. 5 is a detail sectional view on an enlarged scale showing a portion of the base and one of the mirror supporting arms.
Figure 6:
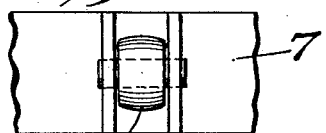
Fig. 6 is a detail section taken on the line 6—6 in Fig. 5.

The base 4 is composed preferably of top and bottom walls 17 and 18 connected by a peripheral wall 19, thus providing a space to accommodate the arms 7 and 8. The peripheral wall 19 is approximately concentric with the pivotal axes 10 and 11 of the arms 7 and 8, and it is provided at opposite sides with horizontal slots 20 and 21 through which the arms 7 and 8 extend and in which said arms operate as they swing about their pivotal axes. The ends 22 and 23 of the slot 20 and the ends 24 and 25 of the slot 21 are so located or spaced apart as to function as limit stops for the arms 7 and 8 respectively to arrest the swing of these arms in either direction and thereby set the side mirrors definitely in their different operative positions. For example, as shown in Figs. 1 and 2, the arms 7 and 8 are positioned against the forward ends 23 and 25 respectively of the slots 20 and 21, the side mirrors 2 and 3 being then swung forwardly from the central mirror 1 so that they extend convergently therefrom at an angle of substantially 54° to one another and at an angle of substantially 63° between each side mirror and the plane of the central mirror 1 when the latter is in its normal position, as shown by the full lines in Fig. 2, the mirrors then occupying the relative positions shown in Fig. 10 so that a person A occupying the position shown in this figure and facing the side mirror 3 will obtain a rear view of himself, the light beam from the rear of the person occupying such position following the path designated $a$ in this figure. While the person occupies the same position shown in Fig. 10, facing the mirror 3, he may obtain a profile view of himself by merely reaching over and swinging the central mirror 1 on its vertical axes into substantially the position shown in Fig. 11 so that the light rays from the person will follow the path designated $a'$ in this figure, this being accomplished without the necessity of the person changing his position with respect to the mirrors. As stated, the side mirrors are set in the relative angular positions shown in Figs. 10 and 11 by the engagement of the mirror supporting arms 7 and 8 against the forward ends 23 and 25 respectively of the slots 20 and 21, and when the side mirrors are in this position, they are sufficiently far apart to enable the user of the mirror to enter between the mirrors and stand on the base 4 or to exit from between the mirrors. With the side mirrors adjusted as just described, a person standing on the base in front of the central mirror 1 and between the side mirrors 2 and 3 may of course obtain a front view of himself by facing and looking into the central mirror 1 when the latter is in its normal position as shown in Fig. 10.

By swinging the side mirrors 2 and 3 rearwardly or toward the central mirror 1, which may be accomplished by applying a swinging movement to either one of the side mirrors, until the arms 7 and 8 rest against the rear ends 22 and 24 respectively of the slots 20 and 21, the side mirrors will be brought into the positions shown in Fig. 12 in which they extend forwardly from the side edges of the central mirror 1 divergently in planes at an angle of approximately 45° to one another and at an angle of approximately 112° between each side mirror and the plane of the central mirror 1 when the latter occupies its normal position. When the mirrors occupy the position shown in Fig. 12, a person A occupying the position on the base 4 substantially as indicated in this figure may obtain either a front view of himself by looking directly into the central mirror 1 or by turning the head to one side while occupying such position and looking into one of the side mirrors, as for example the mirror 3, may obtain a side view of himself, the light beam from the side of the person then following the path designated $a^2$.

These various views may be obtained by a person while occupying substantially the same position on the stand 4, it being merely necessary for the person using the mirror to swing one of the side mirrors to one or the other of its extreme positions as determined by the ends of the slots 20 and 21, the side mirrors being synchronized by the connecting gear segments 12 and 13 so that swinging movement imparted to one of the side mirrors will be communicated to the other side mirror to an equal degree, or when a profile view is desired while the person stands between the side mirrors 2 and 3 adjusted to the position shown in Fig. 11, such may be obtained by merely swinging the central mirror 1 to a suitable angle on its vertical pivot.

Figs. 7, 8 and 9 show the invention applied to a system of mirrors of less than full length and of a form adapted for use on a stand, table or the like, these figures showing the mirrors applied to a toilet or dressing table 30 which may be of any suitable form, the user thereof usually sitting in a chair in front of the table. In this embodiment of the invention, the central and side mirrors 1', 2' and 3' correspond with the central and side mirrors hereinbefore described and they are mounted on a base 4' which is similar to the base 4 but in this instance, the base 4' is adapted to fit upon or form the top of the dressing table, as shown. The central mirror is mounted to swing on a vertical pivot 5' the lower end of which is rotatably mounted in the base 4', and the side mirrors 2' and 3' are carried by arms 7' and 8' which are pivoted on vertical axes 10' and 11' in the base 4' and are operatively connected for synchronized movements by intermeshing gear segments 12' and 13' respectively. The arms 7' and 8' in this embodiment of the invention are also supported by rollers 14' adapted to roll on tracks 15' and 16' mounted on the bottom of the base 4', and the arms 7' and 8' extend horizontally outwardly through slots 20' and 21' in the opposite sides of the base or table top 4'. The forward ends 23' and 25' of the slots 20' and 21' respectively serve to limit the forward swing of the side mirrors 2' and 3' when they reach the positions occupied by the side mirrors 2 and 3 in Figs. 10 and 11, and the rear ends 22' and 24' of the slots 20' and 21' respectively arrest the swing of the side mirrors 2' and 3' when they reach the positions occupied by the mirrors 2 and 3 in Fig. 12. The slots 20' and 21' in the sides of the base or table top 4' do not extend to the front face of the base or table top 4' so that these slots will not be visible from the front of the table. Preferably, the sides of the base or table top 4' are curved concentrically of the axes 10' and 11' about which the side mirrors 2' and 3' swing, and the arms 7' and 8' are preferably bent back upon themselves or looped as indicated at 7ª and 8ª respectively so that they extend around the peripheral edge of the top 17' of the base 4' whereby the side mirrors will overlie the peripheral edges of the top of the base or table top 4'.

In the embodiment of the invention shown in Figs. 7, 8 and 9, a person sitting in front of the table may either swing the side mirrors 2' and 3' forwardly beyond the front edge of the table into the position shown in Figs. 8 and 10 and by looking into one of the side mirrors obtain a rear view of the head, or, while occupying the same position and looking in the same side mirror and tilting the central mirror 1' to the proper angle, may obtain a profile view of the head. While still occupying the same position in front of the table and swinging the side mirrors 2' and 3' rearwardly or toward the central mirror 1' into the positions indicated by the dotted lines in Fig. 8, the person may obtain either a face view by looking directly into the central mirror 1' or may obtain a side view by looking into one or the other of the side mirrors 2' and 3', as indicated in Fig. 12.

In each instance, whether the system of mirrors is of full length for full length views of the figure as in Figs. 1 to 6 inclusive or is of less length as shown in Figs. 7, 8 and 9, the mirrors are adjustable into the different relative positions indicated in Figs. 10, 11 and 12, and the different views of the person using the mirrors, as hereinbefore described, may be obtained without the necessity of changing his position relatively to the mirrors.

The side mirrors, in each instance, are located sufficiently far apart for the user to enter and leave the space between them, whether the side mirrors are swung forwardly from or rearwardly toward the central mirror, and the mirrors are of such dimensions and are so spaced apart as to render visible only a single view or reflection at a time of the person using the mirror, thereby avoiding confusion as would result if a plurality of views or reflections were visible.

In both embodiments of the invention shown, the means operatively connecting the side mirrors to bodily swing synchronously through the same angle, enables the adjustments of these mirrors to be accomplished with facility since a force applied by the hand to either one of these mirrors will swing the other side mirror simultaneously with it. By providing means, such as the ends of the slots in both embodiments, for limiting the swing of the side mirrors, in either direction, the movement of the side mirrors toward or from the central mirror is arrested when they reach the appropriate angles to enable a person to obtain the views hereinbefore described, the side mirrors being thus set automatically and immediately at the definite angles required to enable these views to be obtained. Moreover, the synchronizing connection between the side mirrors in conjunction with the stop means for limiting their movements in both directions insures maintenance of the mirrors in proper operative relation.

I claim as my invention:

1. The combination of a base, a central mirror pivoted on said base at the rear thereof to swing on a vertical axis, a pair of side mirrors, arms adjacently pivoted to the base centrally of and spaced from the front of the central mirror and extending outwardly and supporting the side mirrors transversely on their outer ends to swing bodily on vertical axes into convergent and divergent relations in front of the central mirror, means connecting the supporting arms for the side mirrors and operative to synchronize the bodily swinging movements of the side mirrors into either said convergent or divergent relation, and spaced stops between which the respective supporting arms for the side mirrors are movable and against which they abut when the side mirrors assume said convergent and divergent relations respectively.

2. The combination of a central mirror and a pair of side mirrors, arms adjacently pivoted centrally of and spaced from the front of the central mirror and having free outer ends supporting the side mirrors to swing bodily into convergent and divergent relations in front of the central mirror, and spaced stops between which said supporting arms for the side mirrors are movable, certain of said stops being located to arrest the swing of the side mirrors when they reach such convergent relation as to afford a rear view of a person positioned between the side mirrors and looking into one of them and others of said stops being located to arrest the swing of the side mirrors when they reach such divergent relation as to afford a front or side view of a person positioned in front of the central mirror.

3. The combination of a central mirror and a pair of side mirrors, arms adjacently pivoted centrally of and spaced in front of the central mirror and having free outer ends supporting the side mirrors to swing bodily into convergent and divergent relations in front of the central mirror, means connecting the supporting arms for the side mirrors and operative to synchronize their swinging movements, and spaced stops between which said side mirror supporting arms are movable, certain of said stops being located to arrest the swing of the side mirrors when they reach such convergent relation as to afford a rear view of a person positioned between the side mirrors and looking into one of them and others of said stops located to arrest the swing of the side mirrors when they reach such divergent relation as to afford a front or side view of a person positioned in front of the central mirror.

4. The combination of a base having horizontal slots in the opposite sides thereof, a central mirror mounted on the base at the rear thereof, a pair of upright side mirrors, a pair of arms pivoted at adjacent points on the base substantially at the center thereof on vertical axes and extending outwardly and connected to the respective side mirrors for supporting them to swing bodily, arcuate tracks on the base, rollers on said arms and resting on said tracks and supporting said arms on the base for pivotal movements, and means connecting the inner ends of said arms and operative to synchronize the pivotal movements thereof.

JOHN G. BRYN.